Nov. 18, 1941.   A. R. PEZZILLO   2,263,515
CIRCULATOR AND FLOW VALVE
Filed Sept. 29, 1939   2 Sheets-Sheet 1
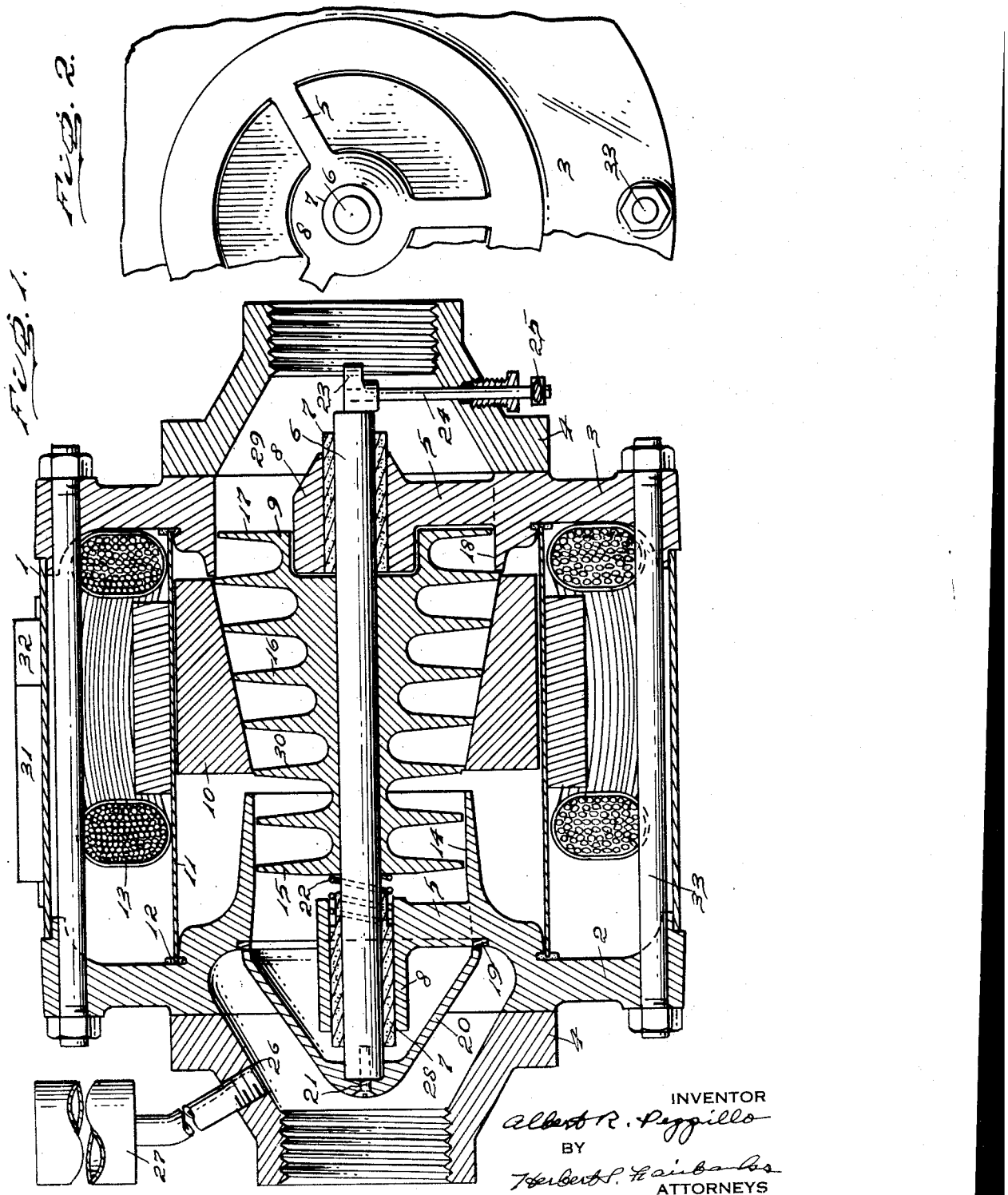
INVENTOR
Albert R. Pezzillo
BY
Herbert P. Fairbanks
ATTORNEYS Nov. 18, 1941.  A. R. PEZZILLO  2,263,515
CIRCULATOR AND FLOW VALVE
Filed Sept. 29, 1939  2 Sheets-Sheet 2
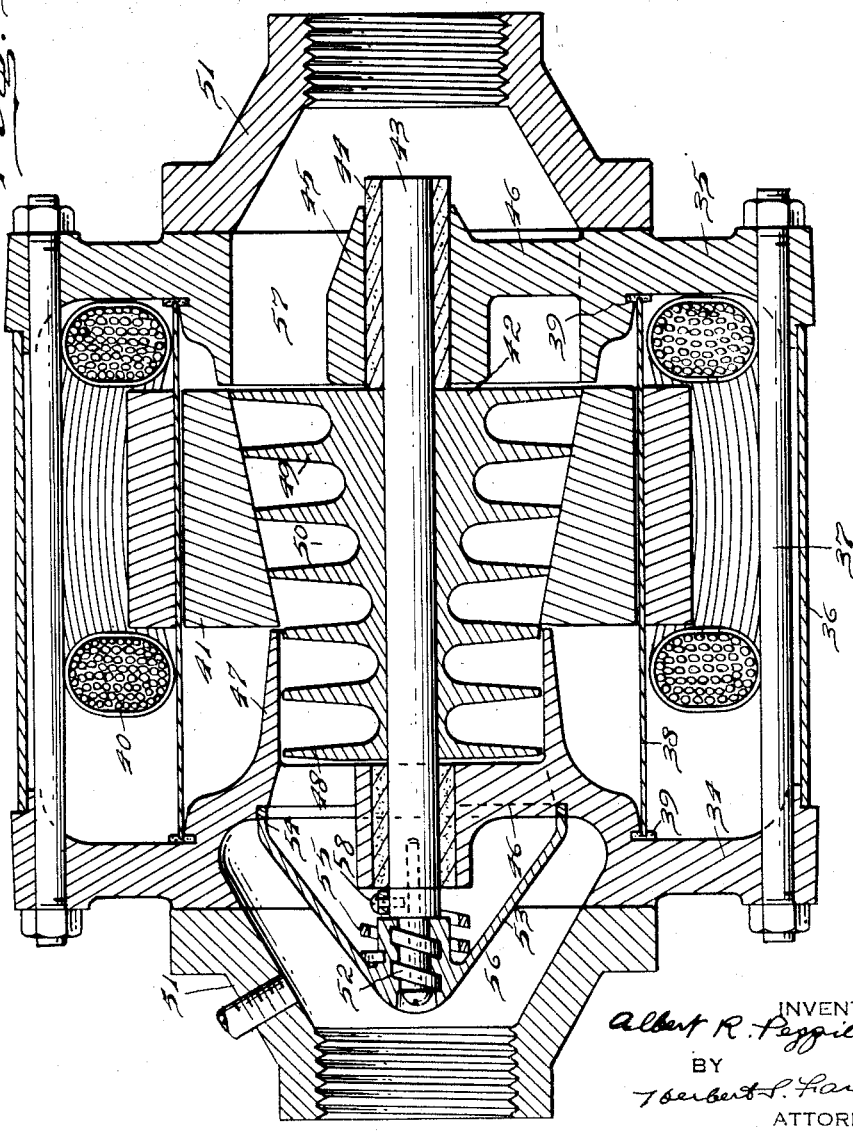

Patented Nov. 18, 1941

2,263,515

UNITED STATES PATENT OFFICE 2,263,515

CIRCULATOR AND FLOW VALVE

Albert R. Pezzillo, Philadelphia, Pa.

Application September 29, 1939, Serial No. 297,051

4 Claims. (Cl. 103—87)

The object of this invention is to devise a novel combined circulator and flow valve which is compact and fool-proof so that if desired, it can be connected in or to a pipe line to effect and control the flow of fluid through the line.

A further object of the invention is to devise a novel device of the character stated having a motor with a tubular rotor which drives an impeller operatively connected with a valve to control it, so that the valve is normally closed but will open and remain open when the stator winding of the motor is energized.

With the above and other objects in view as will hereinafter clearly appear, my invention comprehends a novel circulator and flow valve.

Other novel features of construction and advantage will be hereinafter set forth in the detailed description and the appended claims.

For the purpose of illustrating the invention, I have shown in the accompanying drawings typical embodiments of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Figure 1 is a sectional elevation of a circulator and flow valve embodying my invention.

Figure 2 is an end elevation of a portion of the device.

Figure 3 is a sectional elevation of another embodiment of the invention.

Similar numerals indicate corresponding parts.

Referring to the drawings:

I designates a housing or casing having end covers 2 and 3 provided with flanged pipe fittings 4 to connect to or into a pipe line. The end covers at their central portion are in the form of spiders 5 to provide for the flow and for journalling an impeller shaft 6 mounted in graphite bearings 7 in the hubs 8 of the spiders.

The impeller shaft 6 has an impeller 9, preferably of helical form, secured to it and this impeller is also fixed to the inner wall of a rotor 10, which latter is off-center relatively to its magnetic field. Surrounding the rotor is a stationary casing 11, the ends of which are sealed in annular grooved rings 12 of gasket or fluid sealing material fixed to the end covers. Outwardly of the casing 11 are the stator windings 13 which are sealed from the fluid passing the circulator.

The end cover 2 has a cylindrical portion 14 extending inwardly and laterally and in which an intake portion 15 of the impeller has a working fit with close tolerance. The impeller has an intermediate converging portion 16 and at the discharge end has a straight portion 17 of substantially uniform diameter which has a working fit in a bore 18 formed in the end cover 3.

The end cover 2 is recessed to form an annular valve seat 19 with which a flow valve 20 cooperates, said valve being fixed to the inner end of the shaft 6 by a suitable fastening device 21. The bearing 7 at the intake end of the circulator is cut away to receive a spring 22 which at its out-board end bears against the impeller, so that the tendency of the spring is to move the valve into its closed position and maintain it against its seat.

In order to provide manual means for opening the valve 20, I provide a cam 23 on a rod 24 mounted in the pipe fitting at the discharge end and provided with a grasping handle 25. 26 is a vent in communication with an expansion tank 27.

The pipe fitting at the intake end and the end cover 2 have an enlarged intake 28 which progressively increases in diameter from its intake end. The pipe fitting at the discharge end has an enlarged discharge 29 which preferably decreases in diameter towards the discharge end.

The impeller forms a helically shaped fluid passage 30.

The stationary sealing cylinder 11 has a high electrical resistance and isolates the stator from the rotor and the fluid passing through the circulator. The cylinder or casing 11 is formed of a material which will act as a sound deadener and reduce to a minimum A. C. hum in case A. C. current is used for the motor.

The motor is provided with a relay 31 to provide a high starting torque, and with a conventional over-load cut out 32.

The end covers are secured together by fastening devices 33.

The pipe fittings are preferably bolted to the end covers 2 and 3.

In the broad and generic scope of this invention, the rotation of the rotor causes a valve, controlling the flow through the rotor, to automatically open.

In Figure 3 I have shown another embodiment of the invention illustrative of means different from that shown in Figure 1, to effect the opening of the valve.

In this form of the invention, the housing is formed of end covers 34 and 35 recessed to receive a casing 36, the parts being held together by fastening devices 37. A stationary casing 38 cooperating at its ends with sealing members 39 contributes to seal the stator windings 40 from the rotor 41 and the fluid passing through the circulator. The rotor 41 is tubular and has its bore progressively increasing in diameter towards its outlet end. An impeller 42, preferably having a helical blade, is fixed at its outer portion to the wall of the bore of the rotor and at its inner portion to a shaft 43 journalled in self-lubricating graphite bearings 44 in the hubs 45 of the spiders 46 of the end covers of the housing. The end cover 34 at the intake end has a cylinder 47 into which the intake portion 48 of the impeller 42 extends. This intake portion is of substantially uniform diameter, has a working fit in the cylinder 47 and merges into the portion 49 of the impeller which increases in diameter towards its outlet end. The impeller has a helical groove 50. Flanged pipe fittings 51 are secured in fluid tight engagement with the end covers. The shaft has at one end a worm 52 in threaded engagement with the hub of a valve 53 which cooperates with a valve seat 54. A spring 55 secured at one end to the valve and at its opposite end to the shaft 43, tends to move the valve towards its seat. The spring 55 is secured to the shaft 43 by a fastening device 56.

The pipe fitting and end cover at the intake end has an inlet chamber 56 which progressively increases in diameter, and at the outlet end an outlet chamber 57 is provided of the same diameter as the outlet end of the bore of the rotor and such chamber 57 progressively decreases in diameter to the outlet end of the pipe fitting at the outlet end.

The operation will now be apparent to those skilled in this art and is as follows:

Referring first to the embodiment seen in Figures 1 and 2, the valve 20 is normally maintained closed by the spring 22 augmented by any pressure the fluid may have at the intake end. When the motor circuit is closed and the stator energized, the rotor will revolve and thereby the impeller. The energization of the stator windings and the pitch of the impeller causes the rotor 10 to center itself in the magnetic field and move towards the left thereby opening the valve. The intake end 15 of the impeller will pick up the fluid and carry it to the diverging groove 30 of the impeller and therefrom through the portion of the impeller of uniform diameter 17 at the discharge end to place some compression on the fluid at the discharge end. This portion 17 of uniform diameter at the discharge end may be in many cases omitted.

If the motor circuit is opened, the spring causes the valve to close.

The valve may be manually opened when desired by actuating the rod and cam to cause the rotor impeller shaft and impeller to move towards the intake end. The bearing carried by the end cover 3 limits the movement of the impeller towards the discharge end.

The impeller shaft is axially mounted in self-lubricating bearings in the housing.

If the pressure of the fluid is sufficient at the intake end, the spring can be omitted.

The parts are shown in their normal position in Figure 1, in which case the valve 20 is closed and the stator windings are de-energized. When the circuit is closed the rotor will be centered in the magnetic field causing the rotor and impeller to move towards the inlet and since the valve 20 moves axially with the shaft 6, the valve will open and remain in open position as long as the stator is energized. On the closing of the current, the pressure of the fluid, if any, and the spring 22 causes the valve to close against its seat.

The portion 15 of the impeller picks up the fluid which is carried through the groove of the impeller to the straight portion 15 where it may receive a certain degree of compression.

While I have shown the impeller as having a portion of increasing diameter, it may be of substantially uniform diameter throughout its length, and in many cases in practice the portion 17 may be omitted.

The valve may be manually locked in open position or any degree of opening by turning the cam operating rod 24 which has a friction fit in the wall of its fitting so that it will stay in any position to which it has been adjusted.

In the embodiment seen in Figure 3, it will be apparent that upon the rotation of the rotor, the centrifugal force will cause the valve to move axially on the shaft to open the valve and retain it in open position. When the stator windings are de-energized the spring and the pressure of the fluid if any will close the valve and retain it in closed condition until the motor circuit is again opened.

Having thus described my invention, what I claim as new and desire to secure by Letters Patent is:

1. In a circulator and flow valve, a housing having an intake and a discharge, a stator in the housing forming part of an electric motor, a rotor within the stator and offcenter of the magnetic field of the stator when the latter is deenergized, an impeller carried by the rotor, and a valve connected with the rotor and normally closed, and displaced from closed position an amount equal to the axial displacement of the rotor upon energization of the stator.

2. In a circulator and flow valve, a housing having an intake and a discharge, a stator in the housing forming part of an electric motor, a rotor within the stator and offcenter of the magnetic field of the stator when the latter is deenergized, an impeller carried by the rotor, a valve connected with the rotor, normally closed, and displaced from closed position an amount equal to axial displacement of the rotor upon energization of said stator, and manually actuated means to effect axial displacement of the rotor to open said valve.

3. In a circulator and flow valve, a housing having an intake and a discharge, a cylinder sealed with the housing and contributing with it to form a stator chamber and a rotor chamber, a stator in the stator chamber forming part of an electric motor, a rotor in the rotor chamber and offcenter of the magnetic field of the stator when the latter is deenergized, an impeller carried by the rotor, a shaft fixed to the impeller, and a valve controlling said intake, connected with said shaft, normally closed, and displaced from closed position an amount equal to axial displacement of the rotor upon energization of the stator.

4. In a circulator and flow valve, a housing having an intake and a discharge, a cylinder sealed with the housing and contributing with it to form a stator chamber and a rotor chamber, a stator in the stator chamber forming part of an electric motor, a rotor in the rotor chamber and offcenter of the magnetic field of the stator when the latter is deenergized, an impeller carried by the rotor, a shaft fixed to the impeller, a valve carried by said shaft, controlling said intake, normally closed, and displaced from closed position an amount equal to axial displacement of the rotor upon energization of said stator, and a manually actuated cam engaging said shaft and effective to axially displace it and maintain a predetermined valve opening.

ALBERT R. PEZZILLO.